United States Patent Office 2,846,982
Patented Aug. 12, 1958

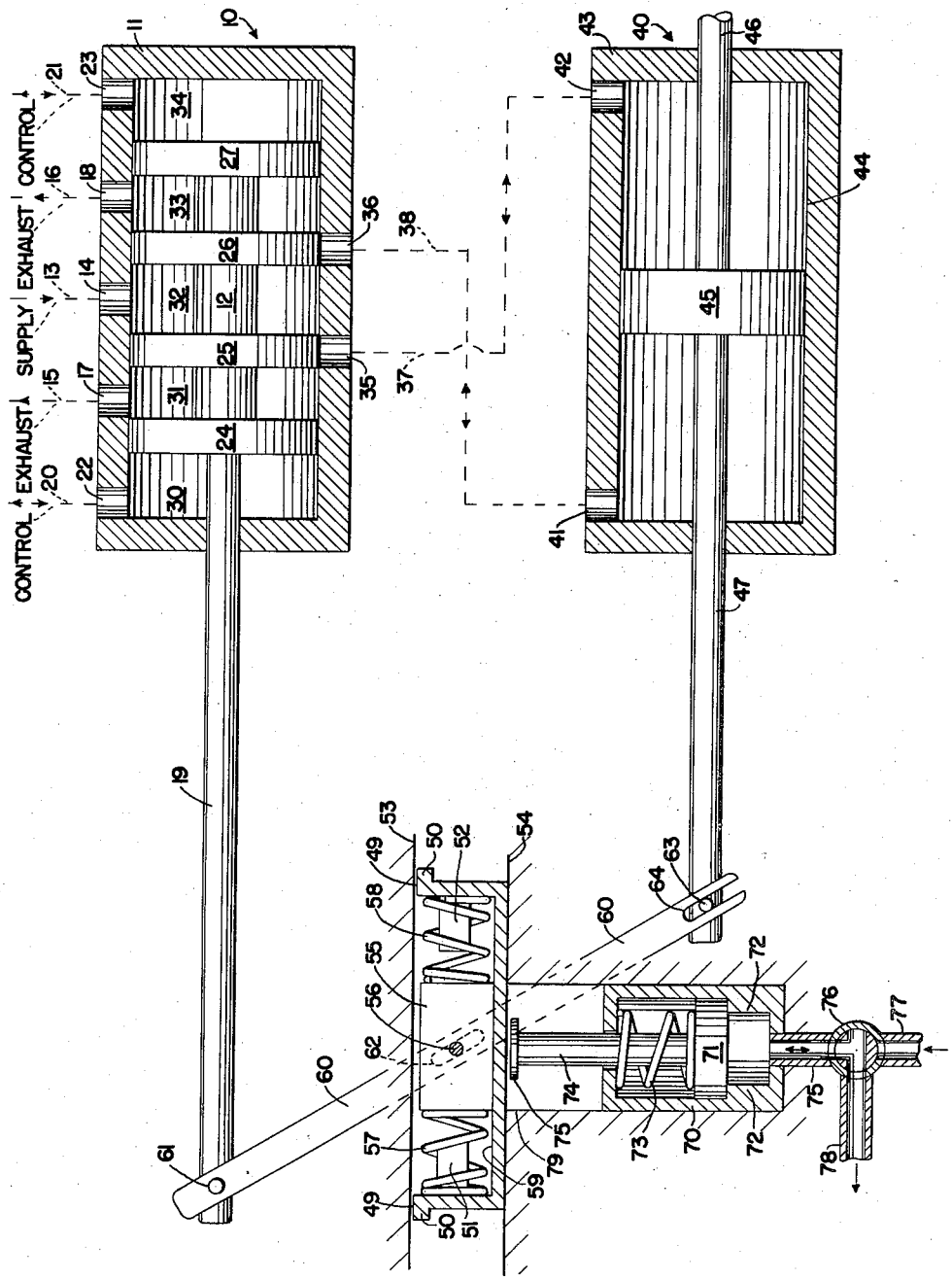

2,846,982

FEEDBACK CONTROL APPARATUS

Dean L. Huppert and Harold P. Sorensen, Minneapolis, Minn., assignors to Minneapolis-Honeywell Regulator Company, Minneapolis, Minn., a corporation of Delaware Application April 19, 1956, Serial No. 579,257

7 Claims. (Cl. 121—41)

This invention relates to improvements in feedback arrangements and specifically concerns an arrangement wherein provision is made for selectively providing or not providing feedback movement between a controlled member and a controlling member. Further, provision is made for initially delaying the feedback movement between the controlled member and the controlling member upon the feedback arrangement being selectively engaged.

Under certain conditions of jet aircraft engine control, such as during aircraft takeoff maneuvers, it is sometimes desired to limit the movement of certain elements of the jet engine, such as the inlet guide vanes of the engine or the tail cone "eyelids" of the engine. However, it is still desired to allow a limited amount of movement of such elements.

The invention contained herein provides an arrangement wherein the controlled member can be limited in its movement by restricting a portion of a feedback member, connecting the controlled member to the controlling member, against unlimited movement. Thus, said portion of the feedback member is allowed to move within a limited area without moving the controlling member and when this lost motion has been taken up, feedback movement is transmitted from the controlled member to the controlling member by the feedback member, thereby placing the controlling member in such a position as to cause no further controlled member movement, regardless of the demand for continued controlled member movement placed on the controlling member. Further, the portion of the feedback member which can be restricted in its movement can be restricted at any location within its normal range of travel and the arrangement is not dependent for its operation on having said portion attain any one predetermined position.

It is an object of this invention to provide an arrangement for selectively causing feedback movement or no feedback movement between a controlled member and a controlling member;

It is a further object of this invention to provide a feedback arrangement wherein feedback movement is transmitted from a controlled member to a controlling member after the feedback arrangement has been engaged and after a predetermined motion of the controlled member has taken place;

It is another object of this invention to provide a feedback arrangement that can be selectively engaged and which when engaged is capable of transmitting feedback movement between a controlled member and a controlling member after a predetermined amount of movement of the controlled member has taken place;

It is still a further object of this invention to provide a feedback arrangement that can be selectively engaged, and which when engaged is operative regardless of the relative positions of the controlled and controlling member and is operative without the feedback arrangement being limited to any one predetermined position upon said engagement.

These and other objects will become apparent from a reading of the following specification and appened claims in conjunction with the accompanying drawing.

The single figure of the drawing shows a portion of a control system utilizing the improved feedback arrangement.

The drawing shows a controlling member in the form of a valve 10 comprising a valve body 11 and a valve spool 12 having a valve shaft 19. A fluid pressure line 13 enters the valve body 11 through orifice 14. Fluid exhaust lines 15 and 16 are connected to orifices 17 and 18 respectively, provided in the valve body 11. Controlled pressure lines 20 and 21, which transmit pressure fluid from a first stage valve, not shown, enter the valve body 11 by means of orifices 22 and 23, respectively. Valve lands 24, 25, 26, and 27 divide the valve body bore into chambers 30, 31, 32, 33, and 34. Valve lands 25 and 26 completely cover orifices 35 and 36 respectively, when the valve spool 12 is in a neutral or closed position.

Controlled pressure lines 37 and 38 lead from the orifices 35 and 36 respectively, of the valve body 11 to orifices 42 and 41, respectively, of a motor body 43 of a hydraulic motor 40. Contained within a bore 44 of the motor body 43, is an actuator piston 45 having a shaft 46 which extends in one direction through an end portion of the motor body 43 for connection to a device not shown, which is to be positioned or actuated thereby. Extending from the actuator piston 45 in the opposite direction is a shaft 47 which passes through the other end portion of the motor body 43.

While the control valve 10 and hydraulic motor 40 are shown as being approximately the same size in the figure, it should be understood that this is merely a schematic showing and that normally, the motor would be much larger than the valve.

A container or channel member 50, having two stop members 51 and 52 suitably attached thereto, is located between two fixed guiding surfaces 53 and 54. A block 55, having a pin 56 securely fastened thereto, rests on bottom surface 59 of the channel member 50 and is biased to a center position and contained within channel member 50 by springs 57 and 58. It will be noted that the distance between the guiding surfaces 53 and 54 is greater than the height of channel member 50. Furthermore, it will be noted that the distance from the bottom surface 59 to top surface 49 of the channel member 50 is greater than the height of block 55. The reason for this arragement will become apparent upon a reading of the description of the operation of the arrangement.

A feedback member 60 is pivotably connected at one of its ends to the valve shaft 19 by a pin 61 and is operatively fastened intermediate its ends to the block 55 by means of pivot pin 56, which extends through a slot 62 in the feedback member. Further, the feedback member 60 is operatively connected at its other end to the actuator shaft 47 by means of a pivot pin 63 in the shaft 47, which extends through a slot 64 in the feedback member.

A cylinder 70 contains an actuator piston 71 normally biased against an annular stop 72 in one end thereof by means of a spring 73. Connected to the actuator piston 71 is a shaft 74 which extends upwardly and through the upper end portion of the cylinder 70. The upper end of the shaft 74 has an enlarged portion 75. Provision, in the form of an opening 79, is made in the lower guiding surface 54 to permit the enlarged portion 75 to engage the bottom of the channel member 50. A three-way valve 76 is connected to the lower end portion of the cylinder 70 by means of a conduit 75. To the three-way valve 76 are connected a fluid pressure supply line 77 and a fluid exhaust line 78.

Operation

With the arrangement shown, the control valve 10 is in a neutral or closed position and the feedback mechanism is disengaged, as the portion of cylinder 70 below actuator 71 is connected to fluid exhaust line 78. With the feedback mechanism disengaged, movement of actuator piston 45 will not result in movement of valve spool 12, but rather will result in a lateral movement of channel 50, block 55, and the elements associated therewith. Thus, should the control pressures in the chambers 30 and 34 change, movement of valve spool 12, in one direction or the other would result. For example, should control fluid be admitted to chamber 30 to increase the pressure therein, the spool 12 and shaft 19 would move to the right, as viewed in the drawing. This movement of valve spool 12 would result in supply pressure fluid being introduced into control line 38 and the left hand chamber of motor 40 to cause movement of actuator piston 45 to the right. The movement of actuator piston 45 would of course result in fluid being forced out of the right hand chamber of the valve body 43 through the control line 37, into chamber 31 of the control valve 10 and then to exhaust port 17 and line 15. The resultant movement of the actuator piston 45 would cause movement of the feedback member 60, but as the channel member 50 is not secured in place, the feedback member 60 would rotate about the pin 61 as a pivot and no feedback movement would be transmitted to the valve spool 12.

Should it be desired to limit the amount of movement of the actuator piston 45, the three-way valve 76 should be rotated so that the exhaust conduit 78 is no longer in communication with the fluid conduit 75, whereas the fluid supply 77 is placed in communication with the fluid conduit 75. This rotation of the three way valve 76 causes pressure fluid to enter the chamber below actuator piston 71 thereby causing an upward movement of the actuator piston 71 and a compression of the spring 73. The actuator piston 71 is caused to be moved upwardly until the enlarged portion 75 at the upper extremity of the shaft 74 engages the lower portion of the channel member 50 and causes the upper surfaces 49 of the channel member 50 to engage the upper guide surface 53. The channel member 50, is thus locked or secured in position and when in this condition, the block 55 is allowed to move within the confines of the channel member, due to the fact that the height of the block 55 is less then the distance between the bottom surface 59 of the channel member 50 and the upper surface 49 of the channel member 50. Now should the control valve be moved from its neutral position, thereby causing a movement of the actuator piston 45, the feedback member 60 continues to move and rotate about the pin 61, as the block 55 is still allowed to travel, due to the lost motion connection between the block 55 and springs 57, 58, and stop members 51 and 52. However, as the actuator piston 45 continues to move, the block 55 engages one of the stop members 51 and 52. Upon one of the stop members 51 and 52 being engaged by the block 55, further movement of the actuator piston 45 results in movement and rotation of the feedback member 60 about the pin 56, thereby causing movement of the valve spool 12 to its closed position. Further changes in the control pressure in the chambers 30 and 34 of the control valve 10, which tends to move the actuator piston 45 in the same direction, will be of no avail, as the force developed in the motor 40 is much greater than the force developed in the chambers 30 and 34 of the control valve 10.

It should be recognized however, that the control valve 10 can cause actuator piston 45 to move in the opposite direction, and this movement of actuator piston 45 will cause the block 55 to be moved away from the stop member it is then engaging and towards the opposite stop member. While this movement of block 55 continues no feedback movement is being transmitted from the actuator piston 45 to the valve spool 12, as the feedback member 60 again rotates about pin 61 as a pivot. This rotation of feedback member 60 about pin 61 will continue until the opposite stop member is engaged, whereupon, further movement of the actuator piston 45, will cause a recentering of the valve spool 12 toward its neutral or closed position. When it is no longer desired to limit the amount of movement of the actuator piston 45, the three-way control valve 76 should be repositioned to the condition shown in the drawing, thereby causing the fluid from the lower end of the cylinder 70 to be passed to the fluid exhaust line 78 and allowing the bias of spring 73 to force the actuator piston 71 against the annular stop 72. The downward movement of the actuator piston results in the releasing of the channel member 50 from its locked or secured position, thus feeding it to move in a lateral direction. As the channel member 50 is released from its locked or secured position, springs 57 and 58 cause the channel member 50 to be positioned in a central location with respect to block 55. Thus, if the channel member 50 is once more locked or secured against movement by operation of the three-way valve 76, the actuator piston 45 will be allowed an initial movement before feedback movement is transmitted from the actuator piston to the valve spool 12.

It is therefore apparent that the arrangement disclosed allows unlimited movement of a controlled member when the feedback mechanism is disengaged and allows a limited amount of movement of the controlled member when the feedback mechanism is engaged, due to the utilization of a lost motion arrangement associated with the portion about which the feedback member rotates when the feedback arrangement is engaged.

It will be further noted, that the arrangement disclosed allows a feedback connection to be made between the motor 40 and the valve 10 which is not dependent upon the block 55 attaining a particular location within its path of travel; or stated another way, block 55 is not limited to any one predetermined position upon a demand for feedback movement between the motor 40 and the valve 10. Thus, feedback movement is capable of being initiated regardless of the relative positions of the movable portions of the motor 40 and the valve 10.

While stop members 51 and 52 have been described as limiting the movement of block 56 when channel member 50 is locked or secured against movement, it will be recognized that the stop members 51 and 52 could be omitted and the springs 51 and 52 could be utilized as stop members after they are compressed to their solid length.

It is to be appreciated that other embodiments of the invention are possible and, therefore, the scope of this invention should be determined from the following claims.

We claim:

1. In control apparatus, the combination comprising a fluid control valve having a movable valve portion, a fluid motor having a movable actuator, said fluid motor being operatively connected to said fluid control valve through a fluid flow connection, and a feedback mechanism normally inoperative but capable of providing feedback movement from said movable actuator to said movable valve portion, said mechanism comprising a feedback member operatively connected to said movable valve portion and to said movable actuator, a normally movable pivot member operatively fastened to said feedback member, a normally movable container for said pivot member, spring means for biasing said pivot member to a central position within said container, said container having a stop member at each end thereof, guide means comprising two opposed fixed surfaces for guiding said container, and means for selectively locking said container in said guide means thereby allowing limited movement of said pivot member against the bias of said spring means before one of said stop members is encountered by said pivot member and feedback movement is transmitted by said feedback member to said movable valve portion.

2. In control apparatus, the combination comprising a fluid control valve having a movable valve portion, a fluid motor having a movable actuator, said fluid motor being fluidly connected to said fluid control valve, and a feedback arrangement normally inoperative but capable of providing feedback movement from said movable actuator to said movable valve portion, said arrangement comprising a lever operatively connected to both said movable actuator and said movable valve portion, a normally movable container, a normally movable member disposed within said container, said member being operatively connected to said lever, spring means normally biasing said member to a central location within said container, guide means comprising two opposed fixed surfaces for guiding said container, and means for selectively holding said container in place thereby allowing feedback movement to be transmitted from said movable actuator to said movable valve portion after the movement of said member has overcome the bias of said spring means.

3. The combination comprising a fluid control valve having a movable portion; fluid motor means having a movable portion and being operatively connected to said control valve and controlled thereby; and means normally inoperative but capable of providing feedback movement from the movable portion of said motor means to the movable portion of said control valve, said means comprising a first normally movable member, holding means for selectively securing said first member in place, and a second member operatively connected to the movable portions of said control valve and said motor means, said second member being operatively fastened to said first member by a lost motion connection such that when said holding means locks said first member against movement said lost motion arrangement allows a limited amount of travel of the movable portion of said motor means before feedback movement is transmitted to the movable portion of said control valve by said second member.

4. The combination comprising a fluid control valve including a movable portion, fluid motor means including a movable portion said control valve being adapted to supply an exhaust pressure fluid to and from said motor to cause movement of the movable portion thereof, motion transmitting means normally inoperable but selectively operable to transmit movement from the movable portion of said motor means to the movable portion of said control valve, said motion transmitting means comprising a first normally movable member, a second normally movable member for containing said first member, a third member operatively fastened to the movable portions of said control valve and said motor means and to said first member, means for selectively holding said second member in place, said second member being operatively fastened to said first member by a lost motion connection such that upon said holding means locking said second member against movement said lost motion arrangement allows a limited amount of travel of the movable portion of said motor means before feedback movement is transmitted to the movable portion of said control valve by said third member.

5. An arrangement wherein feedback movement can selectively be transmitted or not transmitted from a controlled member to a controlling member, comprising a controlled member having a movable portion, a controlling member having a movable portion, a first normally movable member, a second member operatively fastened to the movable portion of said controlled member and the movable portion of said controlling member and to said first member, a third member for limiting the movement of said first member and normally movable with said first member and normally separated therefrom by a lost motion connection, and means for selectively locking said third member in one of various positions to thereby cause feedback movement to be transmitted by said second member from the movable portion of said controlled member to the movable portion of said controlling member after the lost motion of said lost motion connection has been taken up.

6. An arrangement wherein feedback movement can selectively be transmitted or not transmitted from a controlled member to a controlling member, comprising a controlled member having a movable portion, a controlling member having a movable portion, a first member operatively connected to the movable portion of said controlling member and to the movable portion of said controlled member, a second member normally movable and operatively engaging said first member through a lost motion connection, and means selectively operable to lock said second member against movement so that said connection between said first and second members acts as a pivot for said first member after the lost motion of said lost motion connection has been taken up.

7. An arrangement wherein feedback movement can selectively be transmitted or not transmitted from a controlled member to a controlling member comprising a controlled member having a movable portion, a controlling member having a movable portion, a normally movable first member, a second member operatively connected to the movable portion of said controlled member and to the movable portion of said controlling member and to said first member, a lost motion connection associated with the connection between said first and second members, and means selectively operable to initiate feedback movement between the movable portion of said controlled member and the movable portion of said controlling member by limiting the movement of said first member and causing the lost motion of said lost motion connection to be taken up and thereby to provide a positive connection between said first and second members.

References Cited in the file of this patent

UNITED STATES PATENTS

| 746,158 | Reed | Dec. 8, 1903 |
| 926,564 | Hollopeter | June 29, 1909 |
| 1,443,719 | Schott | Jan. 30, 1923 |
| 1,742,892 | Belcher | Jan. 7, 1930 |
| 1,787,614 | Christensen | Jan. 6, 1931 |
| 1,875,226 | Dewandre | Aug. 30, 1932 |
| 1,902,356 | De Monge | Mar. 21, 1933 |
| 2,055,530 | Hallenbeck | Sept. 29, 1936 |
| 2,346,214 | Flowers | Apr. 11, 1944 |

FOREIGN PATENTS

| 673,933 | France | Oct. 14, 1929 |